March 1, 1932. C. C. DE PEW 1,847,553
VARIABLE SPEED TRANSMISSION
Filed May 15, 1930 2 Sheets-Sheet 2

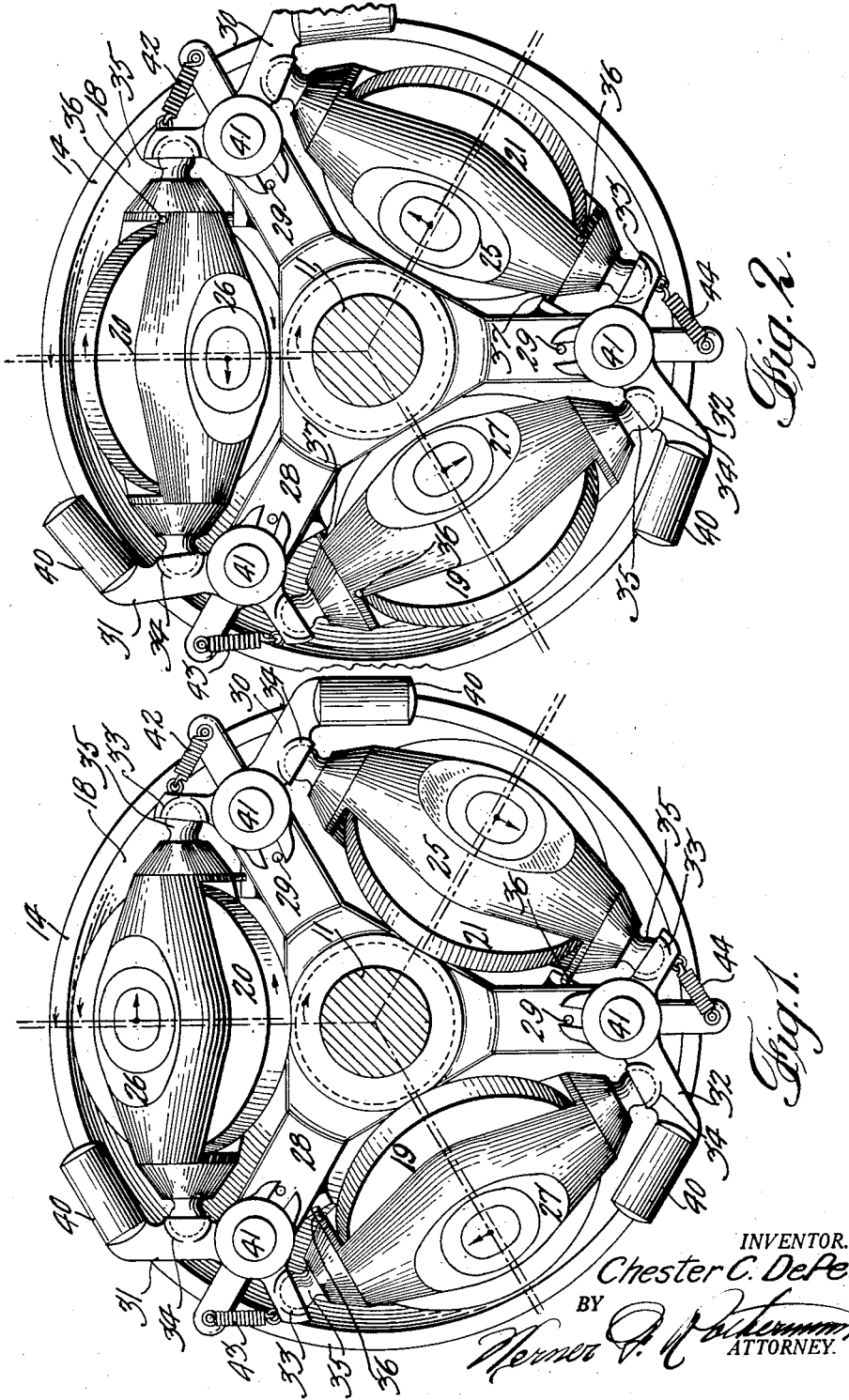

INVENTOR.
Chester C. DePew.
BY
ATTORNEY.

Patented Mar. 1, 1932

1,847,553

UNITED STATES PATENT OFFICE

CHESTER C. DE PEW, OF KEYPORT, NEW JERSEY, ASSIGNOR TO AEROMARINE PLANE & MOTOR COMPANY, INC., A CORPORATION OF NEW YORK

VARIABLE SPEED TRANSMISSION

Application filed May 15, 1930. Serial No. 452,646.

This invention relates generally to variable speed power transmissions of the friction type, and more particularly to apparatus of the class disclosed in Patent No. 1,698,229 issued to Frank A. Hayes on January 8, 1929, in which one rotatable disk or element is driven from another by means of intermediate frictional driving elements designated as "wheels" that are mounted in carriers; said carriers being rotatably mounted on an axis perpendicular to the wheel axis and adapted to be shifted longitudinally of their own axes in a manner as to cause the wheels to be angularly displaced from a low speed position towards high speed and vice versa, this angular displacement being the result of a certain degree of side thrust imposed upon the wheels by the rotation of the disks across the plane of the wheels at the point of contact when the axes of the wheels are moved out of the plane of the disk axis.

In the structure of the above mentioned patent provision is made for the automatic control of "speed" change by a fluid pressure means, and there is also provided a manual control whereby the wheels may be actuated as stated in order to bring into effect any desired speed ratio.

In the present invention the wheels and carriers are constructed and mounted in a manner similar to that of the patent mentioned, but a new and novel control means is provided that is responsive to the centrifugal forces which are engendered to a greater or lesser degree by the speed of the driven member; said speed being governed by the amount of load encountered which accordingly controls the driving ratio of the mechanism making it entirely automatic in operation.

An object of the invention is to provide a simple and compact mechanism for the purpose set forth that is composed of only a small number of elements, thus obviously reducing the cost of manufacture and also the tendency towards non-functioning of the device from failure of the parts.

Various other objects and advantages of the invention will be in part obvious from an inspection of the accompanying drawings and a careful consideration of the following particular description and claims of one form of mechanism embodying my invention.

In the drawings:

Figure 1 is a cross section of the present invention taken on the line 1—1 of Fig. 3 showing the parts as in a low speed position.

Figure 2 is a cross section similar to that of Fig. 1, showing the parts as in a high speed position.

Figure 3:
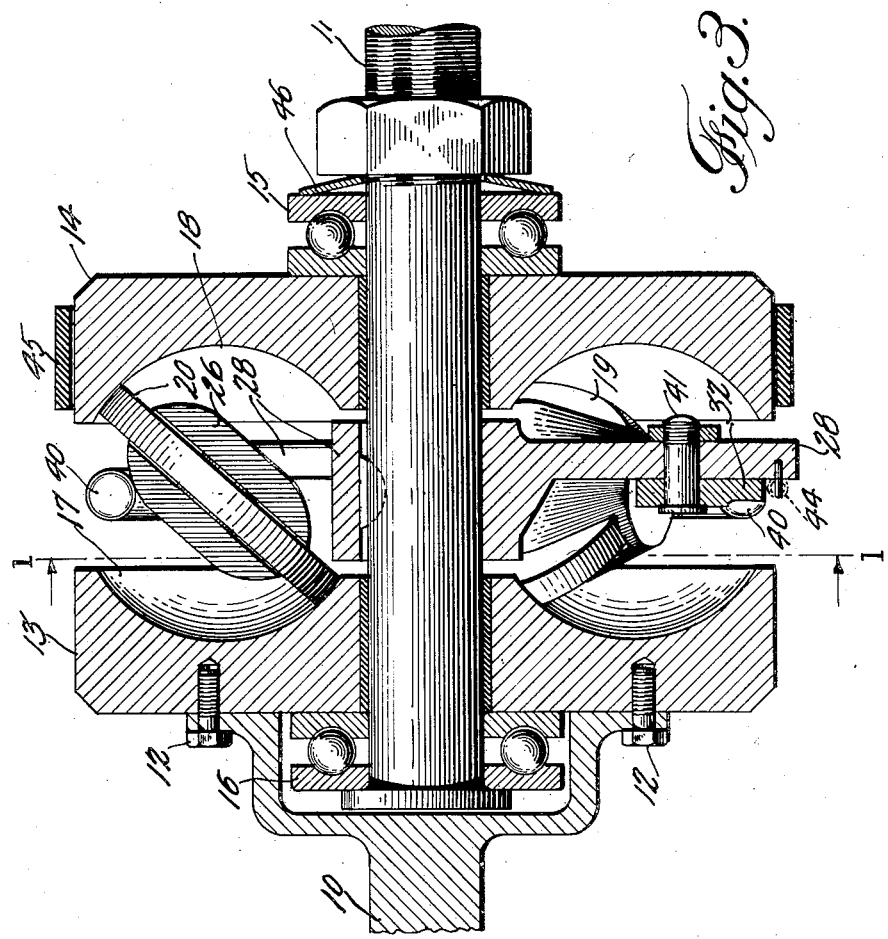
Figure 3 is a longitudinal section of the device in the low speed position.

With reference to the drawings, 10 designates a power shaft driven from a prime mover (not shown) and 11 the driven shaft which may be connected to a means to be operated, in any suitable manner.

To the shaft 10 there is secured as by the screws 12, a disk 13 and a further disk 14 is disposed in co-axially spaced relation to the first said disk, both the disks being floatingly mounted on the shaft 11 between the thrust bearings 15 and 16. These disks are provided on their inner faces with annular grooves 17, 18 of circular cross section, by means of which the disks are drivably engaged by the friction elements or "wheels" 19, 20 and 21 that are mounted for rotation in their carriers 25, 26 and 27.

In the space between the disks 13 and 14 there is disposed in fixed relation with the shaft 11 a suitable cage or spider 28 by which the wheel carriers are operatively supported in a manner presently to be described.

On the spider 28, and remote from the center thereof, are attached in an oscillatory manner, the carrier supporting elements 30, 31 and 32 which are provided with cupped portions 33, 34 for the reception of the spherical ends 35 of the wheel carriers. It will be seen from the structure just described that the carriers 25, 26 and 27 are adapted to be moved axially in unison to a limited extent as governed by the stops 29, and rotationally in either direction to the extent of which the stops 36 and 37 will permit.

The oscillating carrier supporting elements 30, 31 and 32 are also each provided with a weighted portion 40 extended substantially away from the pivot point 41 so as to be highly responsive to any centrifugal force generated by the rotation of the spider 28 which will result in the carriers being moved axially if the rotational speed is sufficiently high to overcome the predetermined power of the springs 42, 43 and 44 which are connected at their opposed ends to the oscillating elements and the spider respectively.

A suitable normally disengaged brake member 45 is provided so that the disk 14 may be engaged and held against rotation, and a yieldable pressure means such as the spring 46 is proposed in order that sufficient pressure may be brought to bear upon the frictionally engaged elements to create driving engagement under load.

The operation of the device is as follows:
With reference to Figs. 1 and 2 it will be seen that the springs 42, 43 and 44 at low speed of operation will tend to maintain the carriers 25, 26 and 27 in a position where the axis of wheel 20 is disposed to the right hand side of the vertical plane of the disk axis, with the axis of the other wheels 19 and 21 disposed correspondingly, as shown by the dotted center lines in Fig. 1 of the drawings, and accordingly, the resulting rotation of the disk 14 across the plane of the wheels will tend to rock the carriers on their axes so that the wheels are maintained adjacent the axis of the driving disk 13 (Fig. 3) whereby the disk 14 will be caused to idle on the shaft 11 at low speed, assuming of course that the clutch 45 is disengaged.

When it is desired to drive the shaft 11, the brake member is actuated so as to engage the disk 14 and restrain the rotation thereof which will result in the spider 28 and the shaft 11 being driven through the friction wheels in a manner common to planetary drives. The low speed position of the carriers and wheels will be maintained as long as the rotational speed of the spider does not become sufficiently high so that the tendency of the weights 40 to move outwardly becomes forceful enough to overcome the predetermined spring means. Should however the speed of the spider be increased beyond the prescribed limit, sufficient centrifugal force will be generated so that the weights will gradually overcome the spring means and the carriers will be moved longitudinally of their axes in a left hand direction as shown by the center lines in Fig. 2. As this longitudinal movement occurs, the carriers will be rocked on their axes and the wheels moved laterally towards the high speed position at a rate dependent upon the acceleration of the driving shaft 11.

Should an overload occur, the speed of the driven shaft 11 will be naturally retarded and the centrifugal force upon the weights will accordingly become less effective to overcome the spring calibration and as a result, the wheels will be automatically moved towards a low speed position to an extent dependent entirely upon the magnitude of the driven load.

Variations may be resorted to within the scope of the invention and portions of the improvements may be used without the others, whilst not departing from the spirit of the invention.

Having thus described my invention, I claim:

1. In a variable-speed friction transmission, the combination of a pair of coaxial disks rotatably mounted, a frictional driving wheel therebetween mounted in a rotatable manner; said wheel being adapted for displacement of its axis laterally across the plane of the disk axis and free for angular movement by the disks when so displaced, and centrifugal means responsive to rotation in a manner as to displace the wheel axis as stated.

2. In a variable-speed friction transmission, the combination of a pair of coaxial disks rotatably mounted, at least one frictional driving wheel therebetween supported in a mounting rotatable on an axis perpendicular to the wheel axis; said wheel being adapted for displacement of its axis across the plane of the disk axis and free for angular deflection by the driving action of at least one of said disks when so displaced, centrifugal means responsive to rotation in excess of a predetermined amount in a manner as to displace the wheel axis as stated, and yielding means subordinate to said centrifugal means to return said wheel to its initial position when rotation falls below the prescribed amount.

3. In a variable-speed friction transmission, the combination of a pair of coaxial disks, a friction wheel between said disks having its edge in frictional driving contact therewith, a carrier for the wheel mounted on an axis perpendicular to the wheel axis, and centrifugal means responsive to rotation in a manner as to shift said carrier longitudinally of its axis.

4. In a variable-speed friction transmission, the combination of a pair of coaxial disks having inner faces in the form of annular grooves of circular cross section, a friction wheel between said disks having its edge in frictional driving contact with the surfaces of said grooves, a carrier for said wheel mounted for rotation on an axis perpendicular to the wheel axis, and centrifugal means responsive to rotation in a manner as to shift said carrier longitudinally of its axis.

5. In a variable-speed friction transmission, the combination of a pair of coaxial disks having inner faces in the form of annular grooves of circular cross section, a friction wheel between said disks having its edge in frictional driving contact with the surfaces of said grooves, a carrier for said wheel mounted on an axis perpendicular to the wheel axis and movable longitudinally of its own axis, a support for the carrier rotatable about the axis of the disks, centrifugal means mounted upon said support and responsive to the rotation thereof so as to move the carrier longitudinally of its axis and rotationally by the force exerted on the wheel by at least one of said disks when the carriers are so moved longitudinally.

6. In a variable-speed friction transmission, the combination of a pair of coaxial disks having inner faces in the form of annular grooves of circular cross section, a plurality of friction wheels between said disks arranged about the disk axis and having their edges in frictional driving contact with the surfaces of said grooves, a carrier for each wheel mounted for rotation on an axis perpendicular to the wheel axis, and means responsive to centrifugal force and common to all of said carriers to shift the same longitudinally of their axes when their rotational speed around the disk axis exceeds a predetermined amount.

7. In a variable-speed friction transmission, the combination of a pair of coaxial disks having inner faces in the form of annular grooves of circular cross section, a friction wheel between said disks having its edge in frictional driving contact with the surfaces of said grooves, a carrier for said wheel mounted for rotation on an axis perpendicular to the axis of the wheel, means for normally holding the carrier with the axis of the wheel to one side of the plane of the disk axis, and centrifugally actuated means adapted to shift the carrier longitudinally of its axis across the plane of the disk axis when its rotational speed around the disk axis exceds a predetermined amount.

8. In a variable-speed friction transmission, the combination with a pair of coaxial disks and frictional driving members therebetween adapted for limited movement of their axes across the plane of the disk axis, of a mounting for said friction members comprising yielding means normally tending to maintain the axes of said friction members to one side of said plane, and centrifugal means responsive to rotation in excess of a predetermined amount to overcome said yielding means and cause the axes of the friction members to cross the axis plane of the disks.

9. In a variable-speed transmission, the combination of a pair of coaxial disks having inner faces in the form of annular grooves of circular cross section, a drive shaft on which said disks are floatingly mounted, a plurality of friction wheels between said disks having their edges in frictional driving contact with the surfaces of said grooves, a carrier for each wheel mounted for rotation on an axis perpendicular to the wheel axis, a support for the carriers mounted in fixed relation with said shaft, centrifugal means mounted upon said support and responsive to the rotation thereof in excess of a predetermined amount to move said carriers longitudinally of their axes and rotationally by the force exerted on said wheels by at least one of said disks when the carriers are so moved, and means to restrain the rotation of one of said disks.

10. In a variable-speed friction transmission, the combination of a pair of coaxial disks having inner faces in the form of annular grooves of circular cross section, a plurality of friction wheels between said disks having their edges in frictional driving contact with the surfaces of said grooves, a carrier for each wheel, a support for the carriers, means pivoted on said support and adapted to engage the ends of the carriers in a manner as to permit axial motion thereof in a direction transverse of the plane of the disk axis and rotational movement on an axis perpendicular to the axis of its wheel, yielding means to normally maintain the wheel axis to one side of said plane in a low speed position, and centrifugal means adapted to overcome the yielding means and effective upon said carriers in a manner as to move the wheel axes across the plane of the disk axis to a high speed position.

11. In a variable-speed friction transmission, the combination with a pair of coaxial disks and an intermediate frictional driving member having a natural tendency for harmonious rolling contact with said disks, of a mounting for said member comprising a spring means adapted to initially overcome said tendency and to restrain said member to a position where it will be subjected to the rotational side thrust of said disks in one direction, and centrifugal means responsive to rotation beyond a predetermined amount to overcome said spring means in a manner as to move said member in the plane of its rotation to a position where it will be subjected to rotational side thrust of the disks in the opposite direction.

12. In a variable-speed friction transmission, the combination with a pair of disks and an intermediate frictional driving member having a natural tendency for harmonious rolling contact with said disks, of an axially rotatable mounting for said driving member comprising centrifugal means responsive to rotation beyond a predetermined amount to overcome said tendency and move said member in the plane of its rotation to a position where it will be subjected to side thrust from said disks due to the rotation thereof.

13. In a variable speed friction transmission, the combination with a pair of coaxial disks and frictional driving members therebetween adapted for limited movement of their axes across the plane of the disk axis, of a mounting for said friction members comprising yielding means tending to maintain the axes of said friction members in an initial position, and centrifugal means responsive to rotation in excess of a predetermined amount to overcome said yielding means and to move said friction members from their initial position across the axis plane of the disks.

Signed at Keyport, in the county of Monmouth, and State of New Jersey this 14th day of May 1930.

CHESTER C. DE PEW.